(12) United States Patent
Partanen

(10) Patent No.: US 6,736,163 B1
(45) Date of Patent: May 18, 2004

(54) TUBE VALVE

(75) Inventor: Jarmo Partanen, Lappeenranta (FI)

(73) Assignee: Larox Flowsys Oy, Lappeenranta (FI)

( * ) Notice: Subject to any disclaimer, the term of this patent is extended or adjusted under 35 U.S.C. 154(b) by 0 days.

(21) Appl. No.: 09/958,954

(22) PCT Filed: Apr. 19, 2000

(86) PCT No.: PCT/FI00/00333

§ 371 (c)(1),
(2), (4) Date: Mar. 14, 2002

(87) PCT Pub. No.: WO00/65263

PCT Pub. Date: Nov. 2, 2000

(30) Foreign Application Priority Data

Apr. 21, 1999 (FI) .................................................. 990895

(51) Int. Cl.⁷ .............................. F16K 37/00; F16K 7/04
(52) U.S. Cl. ................................. 137/551; 251/4; 251/7
(58) Field of Search ................................. 137/551, 554; 251/4, 5, 6, 7, 8, 9, 10

(56) References Cited

U.S. PATENT DOCUMENTS

| | | | | |
|---|---|---|---|---|
| 4,874,007 A | * | 10/1989 | Taylor | 137/312 |
| 5,118,071 A | * | 6/1992 | Huelle | 137/554 |
| 5,143,118 A | * | 9/1992 | Sule | 137/554 |
| 5,207,409 A | | 5/1993 | Riikonen | 251/7 |
| 6,360,773 B1 | * | 3/2002 | Rhodes | 137/554 |

FOREIGN PATENT DOCUMENTS

| | | |
|---|---|---|
| FI | 973140 A | 7/1997 |
| FI | 103143 B | 4/1999 |

* cited by examiner

*Primary Examiner*—John Rivell
(74) *Attorney, Agent, or Firm*—Kubovcik & Kubovcik

(57) ABSTRACT

The invention relates to a pinch valve comprising a housing (1), a sleeve (2), an actuator means (3), pinching jaws or the like valve-closing means (6). The invention is characterized in that the pinch valve has an indicator system adapted thereto for detecting a sleeve damage. The indicator system comprises an electrode or the like indicating sensor element (10) embedded in the structure of the sleeve (2), or integrally forming a part thereof, having an area that covers the inner perimeter area of the sleeve (2) by its major parts.

8 Claims, 2 Drawing Sheets

TUBE VALVE

Figure 1A:
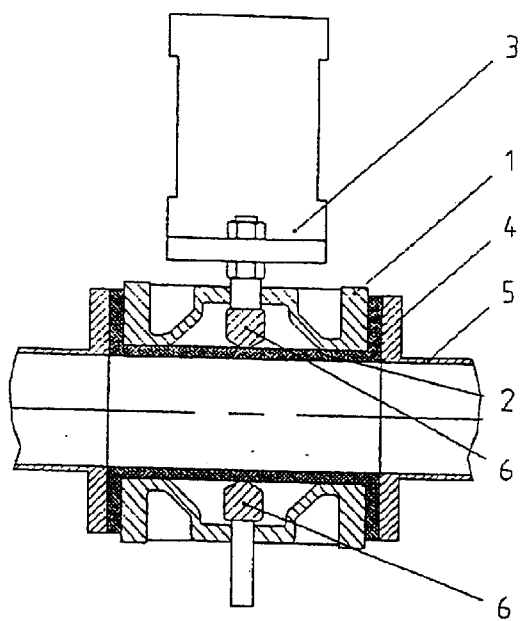

The present invention relates to a pinch valve according to the preamble of claim 1, the valve most typically comprising a housing, a sleeve, pinching jaws and an actuator means controlling the latter.

Generally, pinch valves are used as shutoff and/or control valves in the piping of process industry. The main components of a typical pinch valve are as mentioned above: a housing, a valve sleeve, pinching jaws and an actuator means. To close the valve, the sleeve is pinched simultaneously from two sides between two parallel-aligned, opposing pinching jaws actuated by the actuator means, whereby the sleeve is collapsed closed thus cutting off the flow through the piping.

The elastic sleeve is most conventionally made from rubber having reinforcing components embedded therein, typically consisting of fabric plies. These reinforcing fabric plies serve as the pressure-resistant portion of the sleeve and their number is determined by the pressure rating of the sleeve. The rubber inner lining of the sleeve acts as a sealing zone in the pinched valve and simultaneously protects the reinforcing fabric plies against erosion and chemical attack caused by the flowing medium. The external rubber lining serves to protect the reinforcing fabric plies against wear from the actuator jaws.

The consumable portion of a pinch valve is the sleeve that must be replaced when damaged. In conjunction with erosive media, the need for sleeve replacement generally is invoked by the wear of the sleeve inner lining resulting in defective closing of the valve. If allowed to proceed, the wear of the lining may also cause damage to the reinforcing fabric plies, ultimately causing the valve sleeve to burst. In some applications, chemical media and/or elevated temperatures may embrittle the inner lining of the sleeve. Also pressure hammer impacts imposed via the piping can cause damage to the reinforcing fabric plies of the sleeve, particularly if the reinforcing ply is subjected to chemical stress due to a damage in the sleeve inner lining. Normally, the progress of sleeve damage cannot be detected from the exterior side of the sleeve, whereby a damaged sleeve will express itself only through a bursting sleeve or incomplete closing of the valve.

An approach to overcome the above-noted problem is disclosed, e.g., in publication FI 931990. In this embodiment, the interior structure of the sleeve is provided with a pair of parallel electrodes that are displaced from each other and are connected to a resistance-sensing circuit. Resultingly, a damage to the sleeve inner lining can be detected from a change resistance between the electrodes.

A disadvantage of the arrangement described above is that the electrodes must be made from rather thin wires for practical reasons. The electrodes will be subjected to tensile stress when the valve is closed by collapsing the rubber sleeve between the pinching jaws. Due to such a tension, the electrodes will readily break and thus cause a premature alarm about a sleeve damage.

It is an object of the present invention to provide an arrangement featuring a substantially improved detection of sleeve damage. The characterizing specifications of the invention are disclosed in the appended claims.

A pinch valve described herein comprises a housing, an actuator means, pinching jaws or the like valve-closing means and at least one valve sleeve. The pinch valve according to the invention is provided with an indicator system for detection of sleeve damage of the like change. The system has the valve sleeve structure provided with or adapted thereto an electrode or the like indicating sensor covering of the interior of the valve sleeve by its major parts.

The invention is principally characterized in that the electrode or the like conducting sensor element of the indicator system forms a substantially uniform area embedded in the interior structure of the sleeve, thereby covering the inner perimeter area of the sleeve by its major parts. The other electrode of the measurement circuit of the system is connected, e.g., to a flange of the piping.

According to the invention, the electrode or the like conducting sensor element embedded in the internal structure of the sleeve consists of a plurality of subelements, e.g., a single strand or fabric of wires or the like conductors that are configured to form a uniform area embedded in the sleeve internal structure. Most advantageously, the electrode embedded in the sleeve structure is formed from a plurality of discrete subelements such as wires or the like of the conducting moiety. Thus, the electrode may comprise a plurality of indicating sensors. A particularly advantageous embodiment is realized by making the electrode into a fabric of crossing wires that make an electrical contact at their crossing points thus forming a substantially net-like structure.

The electrode according to the invention is embedded in the interior structure of the rubber sleeve, between the reinforcing fabric ply and the inner lining, during the sleeve fabrication process by vulcanizing, for instance. This arrangement does not exclude an alternative embodiment in which the electrode is adapted between the outer lining and the reinforcing fabric ply or that the electrode is alternatively adapted between two coaxial sleeves. Also the reinforcing fabric of the sleeve may form a netted electrode if the reinforcing fabric itself is conducting or rendered conducting. Respectively, the electrode itself may form at least a portion of the reinforcing fabric of the sleeve.

The other electrode of the measurement circuit of the system is most advantageously configured into a conventional electrode by way of connecting the circuit conductor to, e.g., a flange of the piping. When, e.g., wear or other reason causes damage to the inner lining of the sleeve, the netted electrode is exposed from the internal structure of the sleeve. Resultingly, an electric current can pass from the internal electrode of the sleeve to the electrode conductor attached to the flange via the fluid medium filling the piping. This current can be indicated by means of, e.g., a conductive level sensor circuit or fault-current trip circuit. The current indication can be utilized, e.g., for triggering a fault alarm or planning possible servicing operations.

In accordance with the above description, an electrode structure based on plural subelements, particularly advantageously on a netted structure, can essentially improve the system reliability inasmuch the mechanical breaking of one or even a plurality of the electrode strands will not incapacitate the system.

Figure 1B:
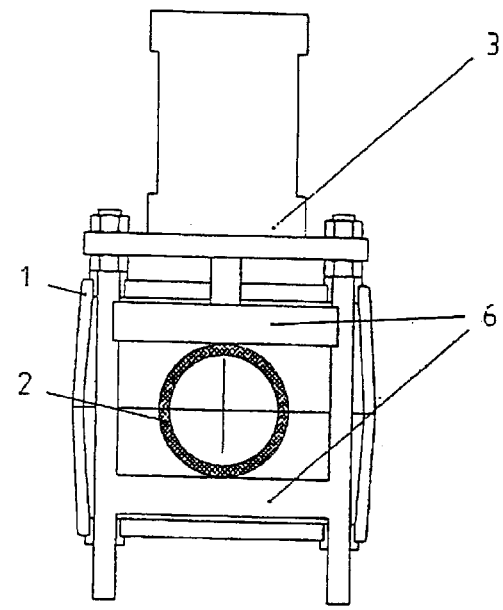
Figure 2:
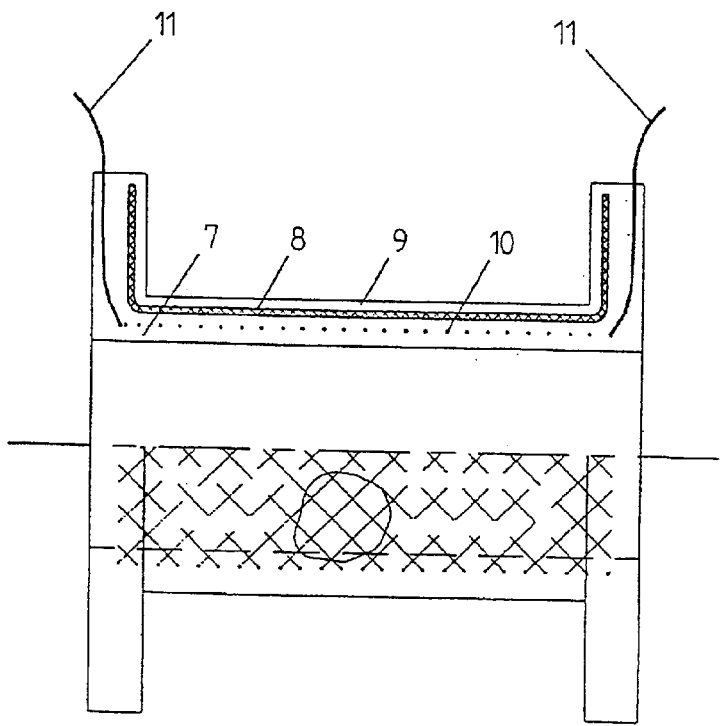
Figure 3:
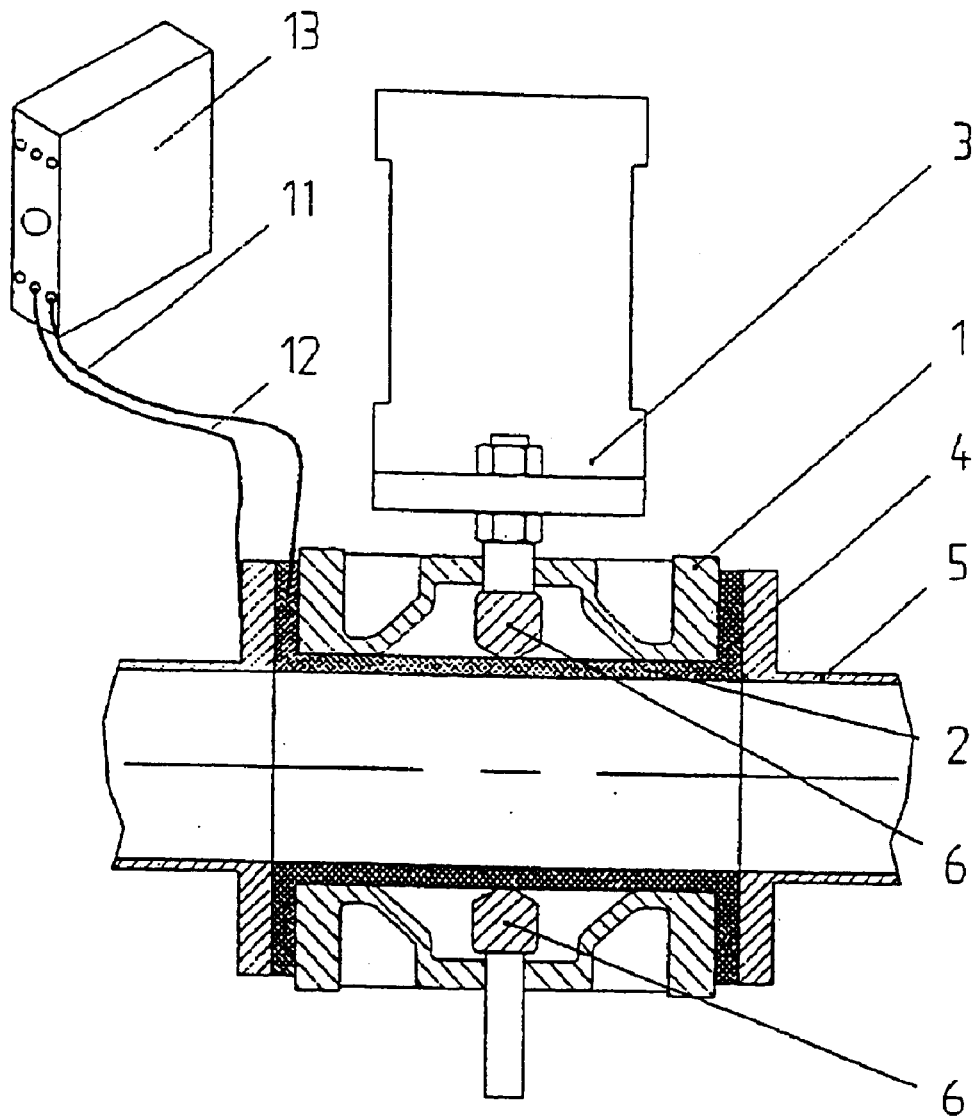

In the following, the invention will be described in greater detail with the help of an exemplifying embodiment by making reference to the appended drawings in which FIG. 1 and FIG. 2 show two views of a pinch valve having a typical state-of-the-art construction; and FIGS. 2 and 3 show a similar pinch valve equipped with an indicator system according to one of the most advantageous embodiments of the invention.

FIG. 1 shows a conventional pinch valve comprising a housing 1, a flexible fabric-reinforced sleeve 2 and an actuator means 3 that may be a pneumatic cylinder, for instance. The sleeve 2 of the pinch valve is in a conventional fashion equipped with flanges 4 that also perform as gaskets when the pinch valve is connected to a piping 5. When the pinch valve is being closed, the actuator means collapses the flexible sleeve 2 with the help of pinching jaws 6 adapted to both sides of the sleeve.

In FIG. 2 is shown an embodiment according to the invention, wherein the sleeve comprises a wear-resistant inner rubber lining 7, a reinforcing ply 8, an outer rubber lining 9, a multiwire electrode or the like indicating sensor element, most advantageously a netted electrode 10 and conductors 11 made by bundling the multiple electrode wires. Most advantageously, the conductors 11 can be passed out from the valve interior via the flanges 4.

In FIG. 3 is shown a sleeve damage indicating system in which the electrode conductor 11 passed out from the valve interior and another electrode conductor 12 attached to the piping are connected to a conductive level sensor circuit 13, for instance.

As noted above, the indicator system connected to a pinch valve comprises an electrode or the like indicating sensor element 10 embedded in the structure of the sleeve 2, or integrally forming a part thereof, having an area that covers the inner perimeter area of the sleeve 2 by its major parts.

The sleeve 2 comprises a length of a flexible, most advantageously fabric-reinforced sleeve having a metallic fabric, textile fabric or the like ply of a material capable of resisting the piping pressure embedded in the sleeve wall, whereby the sleeve 2 may be formed by a single-walled sleeve or assembled from a plurality of coaxially inserted sleeves. The electrode or the like conducting indicating sensor element 10 of the indicator system is embedded in the wall of the sleeve 2 so as to form an essentially uniform area therein and simultaneously to cover the inner perimeter area of the sleeve by its major parts. The electrode is embedded in the interior structure of the sleeve 2, most advantageously between the reinforcing fabric ply and the inner lining, e.g., by vulcanizing, or alternatively is adapted, e.g., between coaxially inserted sleeves. The electrode is most advantageously formed by a netted or the like element 10, which is embedded or integrated in the internal structure of the sleeve 2, whereby it may also act at least partially as a component in the reinforcing ply of the sleeve 2.

The system according to the invention serves for triggering a desired type of indication from, e.g., a damage occurring in the sleeve. The indication is facilitated at the exposure of the electrode 10 from the interior structure of the sleeve, e.g., due to erosion of the wear-resistant inner rubber lining 7 of the sleeve, whereby an electric current passes between the electrodes 11, 12 via the fluid medium filling the piping. This current between the electrodes can be indicated by means of, e.g., a level sensor circuit 13.

To those skilled in the art, it is obvious that the invention is not limited to the above-described exemplifying embodiments, but rather, may be modified within the scope of the appended claims.

What is claimed is:

1. Pinch valve comprising a housing (1), at least one sleeve (2), valve-closing means (6) and an actuator means (3) controlling the latter, characterized in that said pinch valve has an indicator system adapted thereto for detecting sleeve damage, said system comprising an electrode indicating sensor element or a plurality of such elements (10) embedded in the structure of the sleeve (2), or integrally forming a part thereof, said electrode indicating sensor element having an area that covers the inner perimeter area of the sleeve (2) and consisting of conducting wires arranged in a fabric of essentially crossing wires that make electrical contact at their crossing points so as to form a net-like structure.

2. Pinch valve according to claim 1, characterized in that said electrode indicating sensor element (10) of the indicator system consists of a plurality of subelements that are configured to form an essentially uniform area embedded in the internal structure of the sleeve (2), thus covering the inner perimeter area of the sleeve.

3. Pinch valve according to claim 1, characterized in that the sleeve (2) comprises a length of a flexible sleeve having a metallic or textile fabric piping pressure resisting material embedded in the sleeve wall, whereby the sleeve (2) may be either formed by a single-walled sleeve or assembled from a plurality of coaxially inserted sleeves.

4. Pinch valve according to claim 1, characterized in that the electrode indicating sensor element (10) of the indicator system is embedded by vulcanizing in the interior structure of the sleeve (2), between the reinforcing fabric ply and the inner lining, or alternatively is adapted between coaxially inserted sleeves.

5. Pinch valve according to claim 1, characterized in that the electrode indicating sensor element is formed by a netted element (10) that is embedded in the internal structure of the sleeve (2) or integrally forming a part thereof, whereby it may also act at least partially as a component in the reinforcing ply of the sleeve (2).

6. Pinch valve according to claim 5, characterized in that the wires of the netted electrode indicating sensor element (10) are combined into one or a greater number of stranded conductors (11) that are passed to the exterior side of the valve via one or both flanges (4) of the valve.

7. Pinch valve according to claim 1, characterized in that a damage in the sleeve is detected with the help of a detecting circuit of a conductive level sensor or fault current trip means (13) by virtue of measuring the electric current passing between the conductors (11) attached to the electrode (10) and an electrode (12) mounted in the piping.

8. Pinch valve according to claim 1, characterized in that the thickness, material and structure of the electrode conducting indicating element may be varied as required by different applications.

* * * * *